(12) United States Patent
Dorenkamp et al.

(10) Patent No.: US 11,481,787 B2
(45) Date of Patent: Oct. 25, 2022

(54) DETECTING USER DEVICE USAGE AND VALIDATING USER CLAIMS

(71) Applicant: International Business Machines Corporation, Armonk, NY (US)

(72) Inventors: Austin Dorenkamp, Rochester, MN (US); Alexandra Lynn Dorenkamp, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 166 days.

(21) Appl. No.: 17/019,296

(22) Filed: Sep. 13, 2020

(65) Prior Publication Data

US 2022/0084046 A1 Mar. 17, 2022

(51) Int. Cl.
| | |
|---|---|
| *G06Q 30/00* | (2012.01) |
| *G06Q 10/10* | (2012.01) |
| *G06F 40/30* | (2020.01) |
| *G06N 20/00* | (2019.01) |

(52) U.S. Cl.
CPC ......... *G06Q 30/0185* (2013.01); *G06F 40/30* (2020.01); *G06N 20/00* (2019.01); *G06Q 10/10* (2013.01); *G06Q 30/012* (2013.01); *G06Q 30/016* (2013.01)

(58) Field of Classification Search
None
See application file for complete search history.

(56) References Cited

U.S. PATENT DOCUMENTS

| | | | |
|---|---|---|---|
| 6,698,272 B1 | 3/2004 | Almirante | |
| 7,401,052 B2 | 7/2008 | Lyman | |
| 7,880,591 B2 * | 2/2011 | Johnson | G06Q 20/40 340/5.33 |
| 8,482,305 B2 | 7/2013 | Johnson | |
| 8,578,500 B2 * | 11/2013 | Long | G06F 21/50 726/22 |
| 9,146,207 B2 * | 9/2015 | Harper | G06F 1/28 |
| 9,569,729 B1 | 2/2017 | Oehrle et al. | |
| 2006/0184379 A1 | 8/2006 | Tan et al. | |
| 2008/0243530 A1 | 10/2008 | Stubler | |

(Continued)

FOREIGN PATENT DOCUMENTS

| | | |
|---|---|---|
| CN | 103542829 A | 1/2014 |
| CN | 203396968 U | 1/2014 |

OTHER PUBLICATIONS

IFIXIT, "Can Apple Tell If I Dropped My Phone?", Posted Oct. 5, 2012, Accessed Sep. 14, 2019, 2 pages, <https://www.ifixit.com/Answers/View/105271/Can+Apple+Tell+If+I+Dropped+My+Phone>.

*Primary Examiner* — Nafiz E Hoque
(74) *Attorney, Agent, or Firm* — Gilbert Harmon, Jr.; Sonny Zhan (57) ABSTRACT

In an approach for detecting customer usage of a device and validating a customer claim about the device, a processor receives a statement from a user describing usage of a device. A processor identifies correlating events of the usage of the device via applying natural language processing techniques to the statement. A processor analyzes sensor data from the device via applying a learning model, the learning model being pre-trained to associate the sensor data with physical events. A processor provides a credibility score to the statement based on the analysis of the sensor data and the correlating events exacted from the statement.

20 Claims, 3 Drawing Sheets

(56) References Cited

U.S. PATENT DOCUMENTS

| | | |
|---|---|---|
| 2009/0045258 A1 | 2/2009 | Sabeta |
| 2009/0195394 A1 | 8/2009 | Johnson et al. |
| 2009/0276178 A1 | 11/2009 | Goodnow et al. |
| 2011/0109333 A1 | 5/2011 | Porjo et al. |
| 2013/0047963 A1 | 2/2013 | Horsting |
| 2014/0310186 A1 | 10/2014 | Ricci |
| 2015/0097690 A1* | 4/2015 | Ady ................... G08B 21/182 340/665 |
| 2017/0151081 A1 | 6/2017 | Feris et al. |

* cited by examiner

DETECTING USER DEVICE USAGE AND VALIDATING USER CLAIMS

BACKGROUND

The present disclosure relates generally to the field of machine learning and natural language processing, and more particularly to detecting customer usage of a device and validating a customer claim about the device using machine learning and natural language processing techniques.

Machine learning refers to a wide variety of algorithms and methodologies that enable systems to improve their performance over time as it obtains more data and learns from it. Essentially, machine learning is about recognizing trends from data or recognizing the categories that the data fits in so that when the machine-learned system is presented with new data, it can make proper predictions. Machine learning systems train under supervision, learning from examples and feedback, or in unsupervised mode. Machine learning techniques span a wide array of architectures, models, and techniques including neural networks, deep learning, support vector machines, decision trees, self-organizing maps, case-based reasoning, instance-based learning, hidden Markov models, and regression techniques. Natural language processing is a branch of artificial intelligence concerned with analyzing, understanding, and generating natural human languages in order to interface with machines, both in written and spoken forms.

SUMMARY

Aspects of an embodiment of the present disclosure disclose an approach for detecting customer usage of a device and validating a customer claim about the device. The processor receives a statement from a user describing usage of a device. A processor identifies correlating events of the usage of the device via applying natural language processing techniques to the statement. A processor analyzes sensor data from the device via applying a learning model, the learning model being pre-trained to associate the sensor data with physical events. A processor provides a credibility score to the statement based on the analysis of the sensor data and the correlating events exacted from the statement.

DETAILED DESCRIPTION

The present disclosure is directed to systems and methods for detecting customer usage of a device and validating a customer claim about the device using machine learning and natural language processing techniques.

Electronics nowadays are increasingly complex and sometimes fragile. While many electronics manufacturers offer warranties to support the quality of their products, most warranties have explicit conditions describing what is and what is not covered under a warranty. For example, a smartphone manufacturer may provide a one-year warranty that covers the replacement of any part which break for no reason during that the first year. However, if the broken part is incurred because of user negligence (e.g., the user drops a smartphone or spills water on it), then the manufacturer may desire to deny the warranty. However, it can be difficult for the manufacturer to determine whether or not a broken part was due to user negligence.

In one or more embodiments of the present disclosure, a customer device can include one or more sensors. A correlation model can be trained to associate sensor data with physical events. The physical events can be, for example, picking up the device, dropping the device, and plugging a cable into the device. Supervised machine learning can be used to develop the correlation model. When a user makes a statement of use about the device, natural language processing can be used to identify events in the user's statement. The correlation model can be used to validate or refute the user's statement about the specified event and identify any other events in the device's history that may be of interest. Embodiments of the present disclosure can analyze and compare the sensor data to the user's statement about the device and provide a credibility score that validates or refutes the user's statement.

Figure 1:
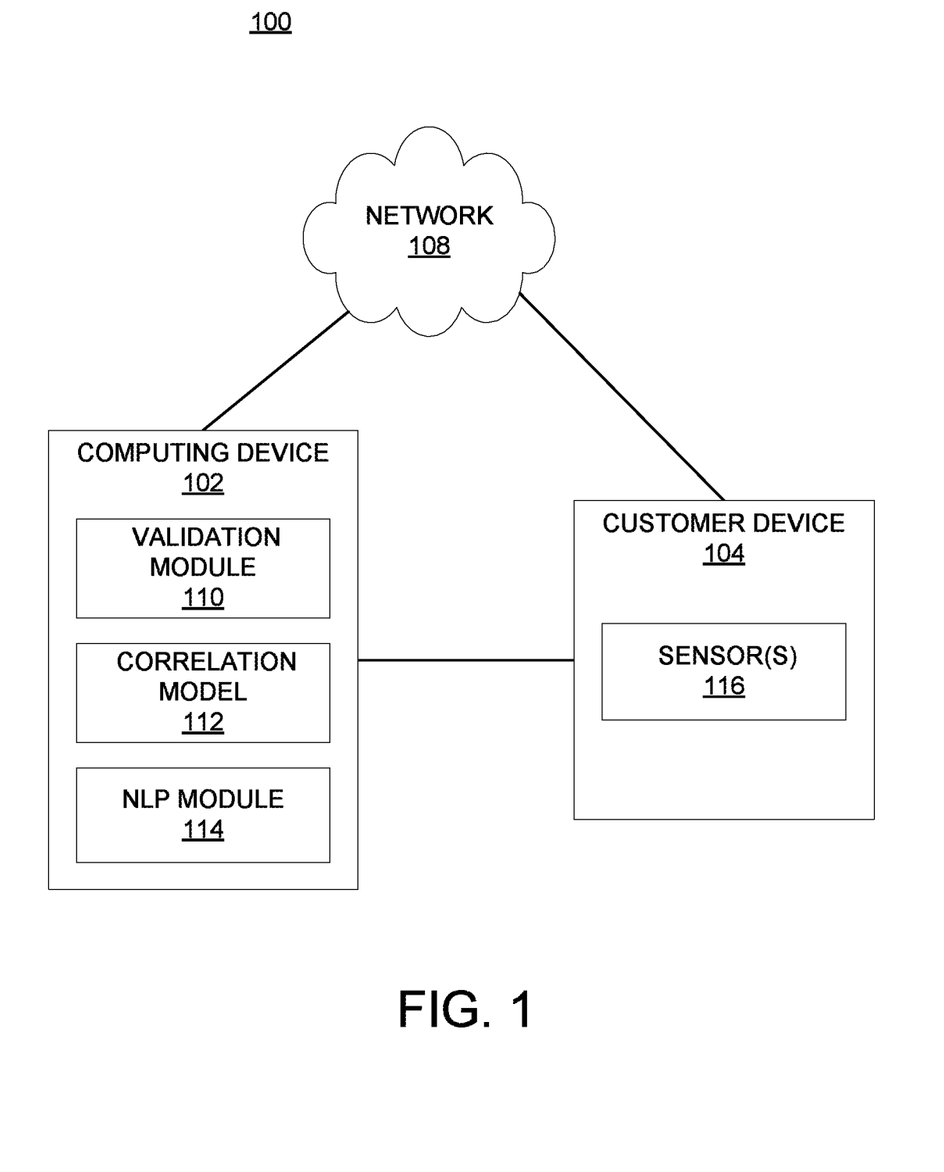
FIG. 1 is a functional block diagram illustrating a customer device statement validation environment, in accordance with an embodiment of the present disclosure.

The present disclosure will now be described in detail with reference to the Figures. FIG. 1 is a functional block diagram illustrating a customer device statement validation environment, generally designated 100, in accordance with an embodiment of the present disclosure.

In the depicted embodiment, customer device statement validation environment 100 includes computing device 102, customer device 104, and network 108. In one or more embodiments, customer device 104 can be a device that has one or more sensors 116. For example, customer device 104 can be a smartphone, a smart watch, a computer, or any other device that has one or more sensor(s) 116. Sensor(s) 116 can be, for example, an accelerometer, a global positioning system (GPS), a fingerprint scanner, or any other sensor which can generate and output collectable sensor data. In the depicted embodiment, sensor(s) 116 are located on customer device 104. However, in other embodiments, sensor(s) 116 may be located externally and accessed through a communication network such as network 108. Customer device 104 may have none or one or more other components (e.g., a screen, a speaker, a light, a circuit board, and others) that may be needed for an operation of customer device 104. Sensor(s) 116 may be considered a component of customer device 104 (i.e. necessary for operation) but a component may not necessarily be a sensor (i.e. output collectable data).

In various embodiments of the present disclosure, computing device 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, computing device 102 represents a computing system utilizing clustered computers and components to act as a single pool of seamless resources. In other embodiments, computing device 102 may represent a server computing system utilizing multiple computers as a server system, such as in a cloud computing environment. In general, computing device 102 can be any computing device or a combination of devices with access to validation module 110, correlation model 112, natural language processor (NLP) module 114, customer device 104, and network 108 and is capable of processing program instructions and executing validation module 110, correlation model 112, and NLP module 114, in accordance with an embodiment of the present disclosure. Computing device 102 may include internal and external hardware components, as depicted and described in further detail with respect to FIG. 3.

Further, in the depicted embodiment, computing device 102 includes validation module 110, correlation model 112, and NLP module 114. In the depicted embodiment, validation module 110, correlation model 112, and NLP module 114 are located on computing device 102. However, in other embodiments, validation module 110, correlation model 112, and NLP module 114 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 102 and validation module 110, correlation model 112, and NLP module 114, in accordance with a desired embodiment of the disclosure.

In one or more embodiments, NLP module 114 is configured to read, understand and derive meaning from a statement of a user using customer device 104. The statement can be in a spoken form, a written form or other suitable form. NLP module 114 may analyze and understand texts, languages and information of the statement from the user. NLP module 114 may understand and identify events in the user's statement. NLP module 114 may identify correlating supporting events based on the understanding of the statement. Validation module 110 may identify correlating refuting contradictory events based on the understanding of the statement. In an example, when a user makes a statement of usage about customer device 104 such as "I never dropped the device", and "The device never left my home", NLP module 114 may understand and identify events in the user's statement. For example, NLP module 114 may identify a "non-dropping" event based on understanding the language "I never dropped the device" from the user. NLP module 114 may identify an "device being at home" event based on understanding the language "The device never left my home" from the user. NLP module 114 may identify the "non-dropping" and "device being at home" events to be correlating supporting events for the user.

In one or more embodiments, correlation model 112 is a learning model that can be trained to associate sensor data from a given device, e.g., customer device 104, with physical events. Correlation model 112 is configured to validate and or refute a statement from a user about events associated with customer device 104 and identify any other events in a history of customer device 104 that may be of interest. The user can disable this feature or have to opt in to have the history of customer device 104 be obtained. The user is in control of what type of information is going to be collected and aware of how that information is going to be used. Correlation model 112 may associate sensor data from sensor(s) 116 with physical events of customer device 104 (e.g., picking up the device, dropping the device, plugging a cable into the device). A supervised machine learning method may be applied to develop correlation model 112. Sensor data can be pre-collected from a group of devices as training data to train correlation model 112. Supervised machine learning can be used to develop correlation model 112 that associates sensor data from a given device with physical events (i.e., picking up the device, dropping the device, plugging a cable into the device) that occurred to the given device. The physical events, for example, can be picking up the device, dropping the device, plugging a cable into the device, or any other physical events that occur to the given device. In an example, correlation model 112 can be trained in a supervised machine learning method. The supervised machine learning method may be a passive training. The passive training may be that a user of the device is periodically asked to record any event that has happened recently with the device when the device is being used normally. For example, if the user indicates that the device is used for a half hour run at an hour ago, the device may associate the sensor data from an hour ago with the event "running." In another example, the supervised machine learning method may be an active training. The active training is when the device is intentionally subjected to specific events (e.g., dropped on the ground, stepped on), the user of the device may record the type of event which the device is subjected to. By using both passive and active training, as well as other suitable supervised machine learning methods not described here, correlation model 112 may associate sensor data with physical events for a given device. For example, an increase in accelerometer sensor data followed by an abrupt stop of all acceleration may be correlated to the "drop" event. In an example, after correlation model 112 processes a predefined number of event-sensor data training sets, correlation model 112 can be used to start associating events with device sensor data on its own.

In one or more embodiments, validation module 110 is configured to receive a statement from a user describing usage of customer device 104. In an example, the statement can include a description what has happened when the user was using customer device 104. The user may make a statement of usage about customer device 104. For example, the user may make a statement such as "I never dropped the device", and "The device never left my home". In another example, the statement can include a request that the user asks a customer service for a refund or a repair when customer device 104 is broken. For example, when a user using customer device 104 brings customer device 104 to a manufacturer or a customer service, the user may make a statement such as "This device just stopped working. I didn't drop it. I just plugged it into the charger. You should replace it for free." In yet another example, the statement can be any description about what has happened on customer device 104 and what request the user may ask a customer service. In an example, the statement can be stated and received in a spoken form when the user speaks to a customer service. In another example, the statement can be written and received in a written form or any other suitable forms.

In one or more embodiments, validation module 110 is configured to identify correlating supporting events and refuting contradictory events via applying natural language processing techniques to the statement using NLP module 114. NLP module 114 may understand and identify events in the user's statement. NLP module 114 may be used by validation module 110 to analyze and understand texts, languages and information of the statement from the user. Validation module 110 may identify the correlating supporting events based on the understanding of the statement via NLP module 114. Validation module 110 may identify the correlating refuting contradictory events based on the understanding of the statement via NLP module 114. In an example, when a user makes a statement of usage about customer device 104 such as "I never dropped the device", and "The device never left my home", NLP module 114 may understand and identify events in the user's statement. For example, NLP module 114 may identify a "non-dropping" event based on understanding the language "I never dropped the device" from the user. NLP module 114 may identify a "device being at home" event based on understanding the language "The device never left my home" from the user. NLP module 114 may identify the "non-dropping" and "device being at home" events to be correlating supporting events for the user. NLP module 114 may identify some other events which may be correlating refuting events for the user.

In one or more embodiments, validation module 110 is configured to analyze sensor data from customer device 104 via applying correlation model 112. Validation module 110 may determine a usage assessment of customer device 104 based on analysis of the sensor data from customer device 104. Validation module 110 may analyze the sensor data using correlation model 112. Validation module 110 may receive the sensor data when the user brings customer device 104 to the customer service. The user can disable this feature or have to opt in to have the sensor data be obtained. The user is in control of what type of information is going to be collected and aware of how that information is going to be used. Validation module 110 may receive the sensor data through network 108. Validation module 110 may receive the sensor data through direct connection between computing device 102 and customer device 104. Validation module 110 may collect available historical sensor data from customer device 104. The user can disable this feature or have to opt in to have the historical sensor data of customer device 104 be obtained. The user is in control of what type of information is going to be collected and aware of how that information is going to be used. In an example, validation module 110 may already have the necessary sensor data from customer device 104 when customer device 104 has been continuously connected to computing device 104. In another example, validation module 110 may retrieve historical sensor data from customer device 104 as soon as customer device 104 is connected to computing device 102 either directly or indirectly through network 108. Customer device 104 may keep historical sensor data in many suitable methods. In an example, customer device 104 may save sensor data up to a predefined time or a predefined storage size. In another example, customer device 104 may monitor a status of components in customer device 104 periodically. When a component in customer device 104 (e.g., the screen) stops working, customer device 104 can save off a set of sensor data just prior to when the component stops working.

Validation module 110 may determine a usage assessment of customer device 104 based on analysis of sensor data from customer device 104 via applying correlation model 112. Correlation model 112 is configured to validate and or refute the user's statement about the events and identify any other events in the device's history that may be of interest. Validation module 110 may apply a supervised machine learning method to develop correlation model 112 that associates sensor data with physical events (e.g., picking up the device, dropping the device, plugging a cable into the device). In one or more embodiments, correlation model 112 is a learning model that can be trained to associate sensor data from a given device, e.g., customer device 104, with physical events. The physical events, for example, can be picking up the device, dropping the device, plugging a cable into the device, or any other physical events that occur to the given device. In an example, correlation model 112 can be trained in a supervised machine learning method. The supervised machine learning method may be a passive training. The passive training may be that a user of the device is periodically asked to record any events that happened recently with the device when the device is being used normally. For example, if the user says that the device was used for a half hour run at an hour ago, the device may associate the sensor data from an hour ago with the event "running." In another example, the supervised machine learning method may be an active training. The active training is when the device is intentionally subjected to specific events (i.e., dropped on the ground, stepped on), the user of the device records the type of event which the device was subjected to. By using both passive and active training, as well as other suitable supervised machine learning methods not described here, correlation model 112 may associate sensor data with physical events for a given device. For example, an increase in accelerometer sensor data followed by an abrupt stop of all acceleration may be correlated to the "drop" event. In an example, after correlation model 112 processes a predefined number of event-sensor data training sets, correlation model 112 can be used to start associating events with device sensor data on its own.

In one or more embodiments, validation module 110 is configured to provide a credibility score to the user's statement based on an analysis of the sensor data and the correlating events in the statement. Validation module 110 may compare the sensor data from customer device 104 to a user statement about customer device 104. Validation module 110 may provide the credibility score that validates or refutes the user's statement. Validation module 110 may apply correlation model 112 to determine if any sensor data on customer device 104 correlates with the events in the user's statement. Validation module 110 may provide an overall credibility score for the user's statement based on the events contained in the statement and the sensor data provided by customer device 104. Validation module 110 may output the usage assessment based on the credibility score, the correlating events, and the sensor data. A manufacturer may use the overall credibility score, event correlations, and associated event confidence scores to evaluate the user's statement.

Figure 2:
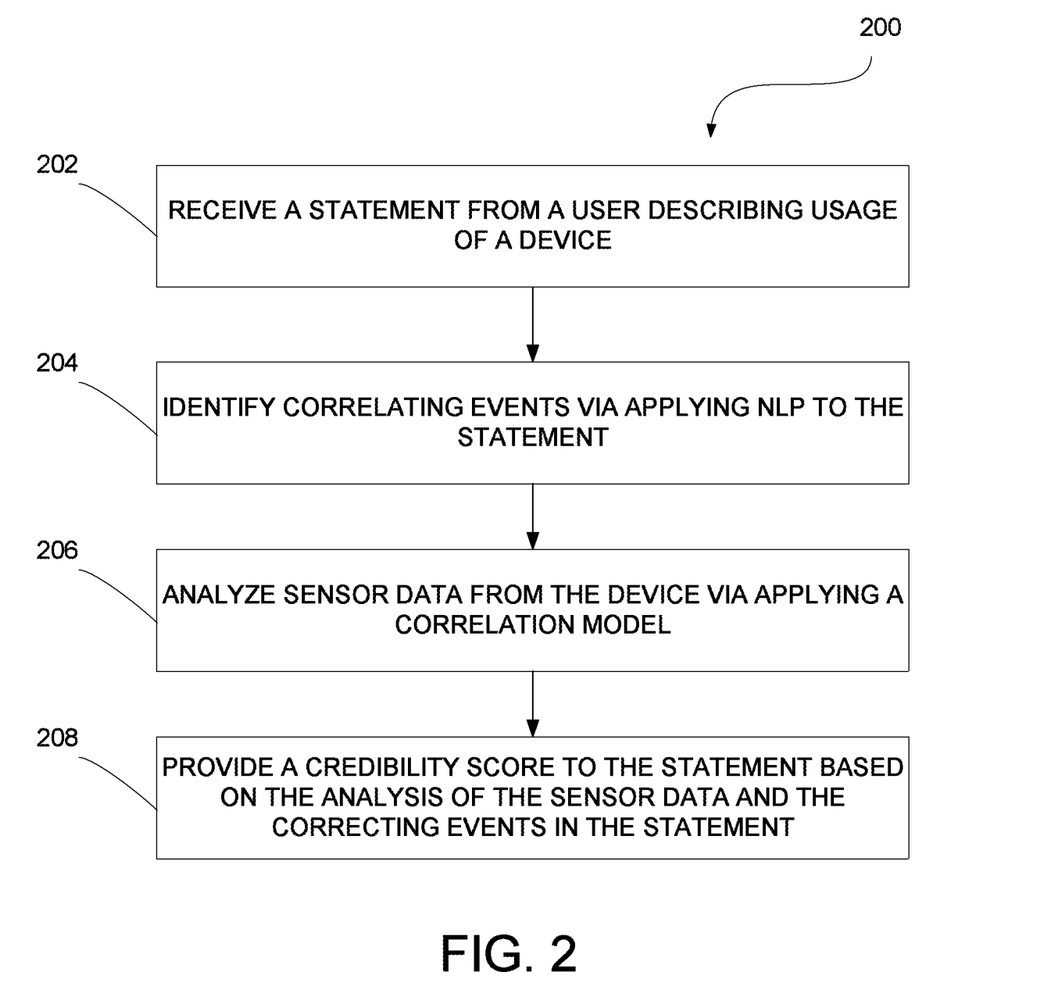
FIG. 2 is a flowchart depicting operational steps of a validation module within a computing device of FIG. 1, in accordance with an embodiment of the present disclosure.

FIG. 2 is a flowchart 200 depicting operational steps of validation module 110 in accordance with an embodiment of the present disclosure.

Validation module 110 operates to receive a statement from a user describing usage of customer device 104. Validation module 110 also operates to identify correlating events via applying natural language processing techniques to the user's statement using NLP module 114. Validation module 110 operates to analyze sensor data from customer device 104 via applying correlation model 112. Validation module 110 operate to provide a credibility score to the user's statement based on an analysis of the sensor data and the correlating events in the statement.

In step 202, validation module 110 receives a statement from a user describing usage of customer device 104. In an example, the statement can include a description what has happened when the user was using customer device 104. The user may make a statement of usage about customer device 104. For example, the user may make a statement such as "I never dropped the device", and "The device never left my home". In another example, the statement can include a request that the user asks customer service for a refund or a repair when customer device 104 is broken. For example, when a user using customer device 104 brings customer device 104 to a manufacturer or customer service, the user may make a statement including examples such as: "This device just stopped working. I didn't drop it. I just plugged it into the charger. You should replace it for free." In yet another example, the statement can be any description about what has happened to customer device 104 and what request the user may ask a customer service. In an example, the statement can be stated and received in a spoken form when the user speaks to a customer service. In another example, the statement can be written and received in a written form or any other suitable forms such as in other suitable typed forms or forms that can be recognized by optical character recognition.

In step 204, validation module 110 identifies correlating events via applying natural language processing techniques to the user's statement using NLP module 114. The correlating events may include supporting events and refuting contradictory events. NLP module 114 may understand and identify events in the user's statement. NLP module 114 may be used by validation module 110 to analyze and understand texts, languages and information of the statement from the user. Validation module 110 may identify the correlating supporting events based on the understanding of the statement via NLP module 114. Validation module 110 may identify the correlating refuting contradictory events based on the understanding of the statement via NLP module 114. In an example, when a user makes a statement of usage about customer device 104 such as "I never dropped the device", and "The device never left my home", NLP module 114 may understand and identify events in the user's statement. For example, NLP module 114 may identify a "non-dropping" event based on understanding the language "I never dropped the device" from the user. NLP module 114 may identify a "device being at home" event based on understanding the language "The device never left my home" from the user. NLP module 114 may identify the "non-dropping" and "device being at home" events to be correlating supporting events for the user. NLP module 114 may identify some other events which may be correlating refuting events for the user.

In step 206, validation module 110 analyzes sensor data from customer device 104 via applying correlation model 112. The user can disable this feature or have to opt in to have the sensor data be obtained. The user is in control of what type of information is going to be collected and aware of how that information is going to be used. Validation module 110 may determine a usage assessment of customer device 104 based on analysis of sensor data from customer device 104. Validation module 110 may analyze the sensor data using correlation model 112. Validation module 110 may receive the sensor data when the user brings customer device 104 to the customer service. Validation module 110 may receive the sensor data through network 108. Validation module 110 may receive the sensor data through direct connection between computing device 102 and customer device 104. Validation module 110 may collect available historical sensor data from customer device 104. The user can disable this feature or have to opt in to have the historical sensor data of customer device 104 be obtained. The user is in control of what type of information is going to be collected and aware of how that information is going to be used. In an example, validation module 110 may already have the necessary sensor data from customer device 104 when customer device 104 has been continuously connected to computing device 104. In another example, validation module 110 may retrieve historical sensor data from customer device 104 as soon as customer device 104 is connected to computing device 102 either directly or indirectly through network 108. Customer device 104 may keep historical sensor data in many suitable methods. In an example, customer device 104 may save sensor data up to a predefined time or a predefined storage size. In another example, customer device 104 may monitor a status of components in customer device 104 periodically. When a component in customer device 104 (e.g., the screen) stops working, customer device 104 can save sensor data just prior to when the component stopped working. Validation module 110 may determine a usage assessment of customer device 104 based on analysis of sensor data from customer device 104 via applying correlation model 112. Correlation model 112 is configured to validate or refute the user's statement about the events and identify any other events in the device's history that may be of interest. Validation module 110 may apply a supervised machine learning method to develop correlation model 112 that associates sensor data with physical events (e.g., picking up the device, dropping the device, plugging a cable into the device). In one or more embodiments, correlation model 112 is a learning model that can be trained to associate sensor data from a given device, e.g., customer device 104, with physical events. The physical events, for example, can be picking up the device, dropping the device, plugging a cable into the device, or any other physical events that occur to the given device. In an example, correlation model 112 can be trained in a supervised machine learning method. The supervised machine learning method may be a passive training. The passive training may be that a user of the device is periodically asked to record any events that happened recently with the device when the device is being used normally. For example, if the user says that the device was used for a half hour run an hour ago, the device may associate the sensor data from an hour ago with the event "running." In another example, the supervised machine learning method may be an active training. The active training is when the device is intentionally subjected to specific events (i.e., dropped on the ground, stepped on), the user of the device records the type of event which the device is subjected to. By using both passive and active training, as well as other suitable supervised machine learning methods not described here, correlation model 112 may associate sensor data with physical events for a given device. For example, an increase in accelerometer sensor data followed by an abrupt stop of all acceleration may be correlated to the "drop" event. In an example, after correlation model 112 processes a predefined number of event-sensor data training sets, correlation model 112 can be used to start associating events with device sensor data on its own.

In step 208, validation module 110 provides a credibility score to the user's statement based on an analysis of the sensor data and the correlating events in the statement. Validation module 110 may compare the sensor data from customer device 104 to the user's statement about customer device 104. Validation module 110 may provide the credibility score that validates or refutes the user's statement. Validation module 110 may apply correlation model 112 to determine if any sensor data on customer device 104 correlates with the events in the user's statement. Validation module 110 may provide an overall credibility score for the user's statement based on the events contained in the statement and the sensor data provided by customer device 104. For example, the overall credibility score can be based on how many matches between the identified events and the sensor data provided by customer device 104. Each match can be scored so that the overall credibility score can be aggregated. In addition, each match can be pre-weighed based on the characters of the physical events. In another example, the overall credibility score can be just outputted as in a binary creditable or not credible situation based on the analysis of the sensor data and the correlating events in the statement. Validation module 110 may output the usage assessment based on the credibility score, the correlating events, and the sensor data. A manufacturer may use the overall credibility score, event correlations, and associated event confidence scores to evaluate the user's request.

Figure 3:
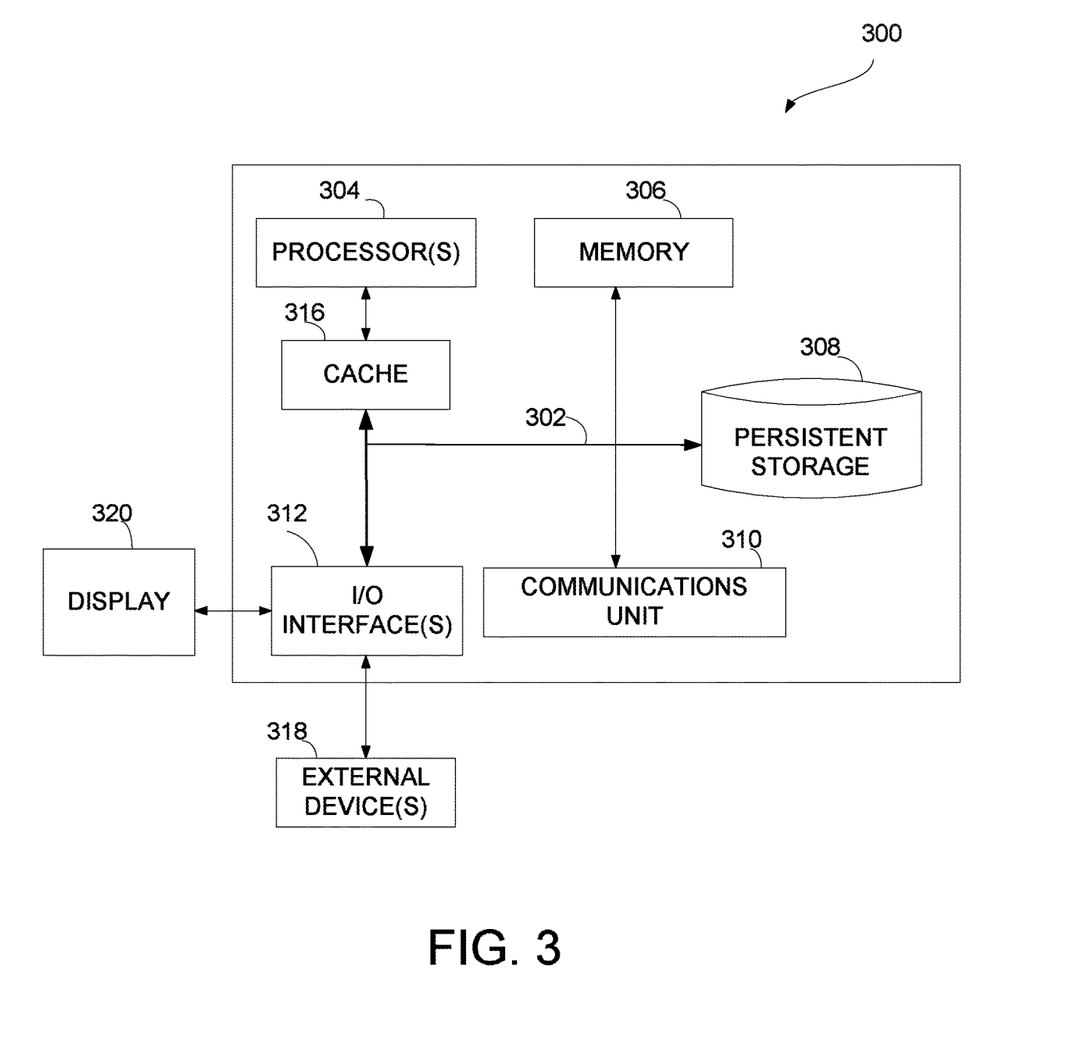
FIG. 3 is a block diagram of components of the computing device of FIG. 1, in accordance with an embodiment of the present disclosure.

FIG. 3 depicts a block diagram 300 of components of computing device 102 in accordance with an illustrative embodiment of the present disclosure. It should be appreciated that FIG. 3 provides only an illustration of one implementation and does not imply any limitations with regard to the environments in which different embodiments may be implemented. Many modifications to the depicted environment may be made.

Computing device 102 may include communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Validation module 110, correlation model 112, and NLP module 114 may be stored in persistent storage 308 and in memory 306 for execution by one or more of the respective computer processors 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Validation module 110, correlation model 112, and NLP module 114 may be downloaded to persistent storage 308 through communications unit 310.

I/O interface(s) 312 allows for input and output of data with other devices that may be connected to computing device 102. For example, I/O interface 312 may provide a connection to external devices 318 such as a keyboard, keypad, a touch screen, and/or some other suitable input device, for example, customer device 104. External devices 318 can also include portable computer readable storage media such as, for example, thumb drives, portable optical or magnetic disks, and memory cards. Software and data used to practice embodiments of the present invention, e.g., validation module 110, correlation model 112, and NLP module 114 can be stored on such portable computer readable storage media and can be loaded onto persistent storage 308 via I/O interface(s) 312. I/O interface(s) 312 also connect to display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
receiving, by one or more processors, a statement from a user describing usage of a device associated with a sensor;
identifying, by one or more processors, correlating events of the usage of the device via applying natural language processing techniques to the statement with a natural language processing module;
analyzing, by one or more processors, sensor data generated from the sensor from the device via applying a machine learning model, the machine learning model being pre-trained to associate the sensor data with physical events;
providing, by one or more processors, a credibility score to the statement based on the analysis of the sensor data and the correlating events extracted from the statement.

2. The computer-implemented method of claim 1, wherein the correlating events include supporting events, the supporting events being supportive to the statement.

3. The computer-implemented method of claim 1, wherein the correlating events include refuting events, the refuting events being contradictory to the statement.

4. The computer-implemented method of claim 1, wherein analyzing the sensor data from the device includes determining a usage assessment of the device.

5. The computer-implemented method of claim 4, wherein analyzing the sensor data from the device includes comparing the usage assessment of the device to the correlating events identified in the statement of the user.

6. The computer-implemented method of claim 1, wherein the machine learning model is trained in a supervised machine learning method.

7. The computer-implemented method of claim 1, further comprising:
outputting, by one or more processors, the usage assessment based on the credibility score, the correlating events, and the sensor data.

8. A computer program product comprising:
one or more computer readable storage media, and program instructions collectively stored on the one or more computer readable storage media, the program instructions comprising:
program instructions to receive a statement from a user describing usage of a device associated with a sensor;
program instructions to identify correlating events of the usage of the device via applying natural language processing techniques to the statement with a natural language processing module;
program instructions to analyze sensor data generated from the sensor from the device via applying a machine learning model, the machine learning model being pre-trained to associate the sensor data with physical events; and
program instructions to provide a credibility score to the statement based on the analysis of the sensor data and the correlating events extracted from the statement.

9. The computer program product of claim 8, wherein the correlating events include supporting events, the supporting events being supportive to the statement.

10. The computer program product of claim 8, wherein the correlating events include refuting events, the refuting events being contradictory to the statement.

11. The computer program product of claim 8, wherein instructions to analyze the sensor data from the device include instructions to determine a usage assessment of the device.

12. The computer program product of claim 11, wherein instructions to analyze the sensor data from the device include instructions to compare the usage assessment of the device to the correlating events identified in the statement of the user.

13. The computer program product of claim 8, wherein the machine learning model is trained in a supervised machine learning method.

14. The computer program product of claim 8, further comprising:
program instructions, stored on the one or more computer-readable storage media, to output the usage assessment based on the credibility score, the correlating events, and the sensor data.

15. A computer system comprising:
one or more computer processors, one or more computer readable storage media, and program instructions stored on the one or more computer readable storage media for execution by at least one of the one or more computer processors, the program instructions comprising:
program instructions to receive a statement from a user describing usage of a device associated with a sensor;
program instructions to identify correlating events of the usage of the device via applying natural language processing techniques to the statement with a natural language processing module;
program instructions to analyze sensor data generated from the sensor from the device via applying a machine learning model, the machine learning model being pre-trained to associate the sensor data with physical events; and
program instructions to provide a credibility score to the statement based on the analysis of the sensor data and the correlating events extracted from the statement.

16. The computer system of claim 15, wherein the correlating events include supporting events, the supporting events being supportive to the statement.

17. The computer system of claim 15, wherein the correlating events include refuting events, the refuting events being contradictory to the statement.

18. The computer system of claim 15, wherein instructions to analyze the sensor data from the device include instructions to determine a usage assessment of the device.

19. The computer system of claim 18, wherein instructions to analyze the sensor data from the device include instructions to compare the usage assessment of the device to the correlating events identified in the statement of the user.

20. The computer system of claim 15, wherein the machine learning model is trained in a supervised machine learning method.

* * * * *